US012798621B2

(12) United States Patent
Mitsui et al.

(10) Patent No.: US 12,798,621 B2
(45) Date of Patent: Nov. 17, 2026

(54) INFORMATION PROCESSING DEVICE, AND CONTROL METHOD

(71) Applicant: Mitsubishi Electric Corporation, Tokyo (JP)

(72) Inventors: Yoshiki Mitsui, Tokyo (JP); Hideaki Terashima, Tokyo (JP); Yoshie Imai, Tokyo (JP); Shunya Osawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 55 days.

(21) Appl. No.: 18/927,678

(22) Filed: Oct. 25, 2024

(65) Prior Publication Data

US 2025/0050914 A1 Feb. 13, 2025

Related U.S. Application Data

(63) Continuation of application No. PCT/JP2022/022924, filed on Jun. 7, 2022.

(51) Int. Cl.
*G01C 21/00* (2006.01)
*B60W 60/00* (2020.01)
*G01C 21/34* (2006.01)

(52) U.S. Cl.
CPC ... *B60W 60/00256* (2020.02); *G01C 21/3438* (2013.01); *B60W 2554/404* (2020.02); *B60W 2556/50* (2020.02); *B60W 2556/65* (2020.02)

(58) Field of Classification Search
CPC ..... B60W 60/00256; B60W 2554/404; B60W 2556/50; B60W 2556/65; G01C 21/3438;
(Continued)

(56) References Cited

U.S. PATENT DOCUMENTS 10,942,517 B2 * 3/2021 Koda ................ B60W 60/0059
12,097,848 B2 * 9/2024 Motoyama .......... B60W 30/095
(Continued)

FOREIGN PATENT DOCUMENTS

JP 2002-321828 A 11/2002
JP 2012-121700 A 6/2012
(Continued)

OTHER PUBLICATIONS

International Search Report for PCT/JP2022/022924 (PCT/ISA/210) mailed on Aug. 30, 2022.

*Primary Examiner* — Ian Jen
(74) *Attorney, Agent, or Firm* — Birch, Stewart, Kolasch & Birch, LLP

(57) ABSTRACT

An information processing device includes an acquisition unit that acquires map information, position information on a first mobile object as a mobile object capable of moving by means of manual driving or autonomous driving, and position information on a second mobile object as a mobile object capable of carrying a parcel and moving by means of autonomous driving, a generation unit that generates course information regarding the second mobile object based on the map information, the position information on the first mobile object, and the position information on the second mobile object, and a control unit that performs control based on the course information regarding the second mobile object on the second mobile object.

20 Claims, 16 Drawing Sheets

(58) Field of Classification Search
CPC .. G06Q 10/047; G06Q 10/04; G06Q 10/0836; G06Q 10/083; G08G 1/205; G08G 1/202
See application file for complete search history.

(56) References Cited

U.S. PATENT DOCUMENTS

| | | | | |
|---|---|---|---|---|
| 2019/0043001 | A1 | 2/2019 | Woulfe et al. | |
| 2020/0310438 | A1 | 10/2020 | Suzuki et al. | |
| 2020/0348662 | A1 * | 11/2020 | Cella .................... | G05B 13/028 |
| 2021/0365040 | A1 | 11/2021 | Tomono et al. | |

FOREIGN PATENT DOCUMENTS

| | | | |
|---|---|---|---|
| JP | 2015-79453 | A | 4/2015 |
| JP | 2020-71714 | A | 5/2020 |
| JP | 2020-160708 | A | 10/2020 |
| WO | WO 2020/035902 | A1 | 2/2020 |

* cited by examiner

FIG. 14

111

| SCORE TABLE | | |
|---|---|---|
| PLACE | SCORE | REMARKS |
| PLACE WHERE VEHICLE SHOULD NOT STOP | −100 | |
| PLACE WITH A LOT OF FOOT TRAFFIC | −20 | |
| PLACE FAR FROM SHOP | 20 | |
| PLACE WHERE ROOF EXISTS | 10 | 100 WHEN WEATHER IS RAIN |
| BRIGHT PLACE | 0 | 50 WHEN TIME SLOT IS AT NIGHT |
| PLACE NEARBY USER'S FAVORITE SHOP | 30 | |

INFORMATION PROCESSING DEVICE, AND CONTROL METHOD

CROSS-REFERENCE TO RELATED APPLICATION

This application is a continuation application of International Application No. PCT/JP2022/022924 having an international filing date of Jun. 7, 2022, which is hereby expressly incorporated by reference into the present application.

BACKGROUND OF THE INVENTION

1. Field of the Invention

The present disclosure relates to an information processing device, and a control method.

2. Description of the Related Art

A commodity is delivered as a result of an order for the commodity and a request for delivery or the like. Here, a technology regarding delivery has been proposed (see Patent Reference 1). For example, an information management center in the Patent Reference 1 determines a rendezvous point by comparing course information regarding a vehicle in which the orderer of a commodity is riding with course information regarding a delivery vehicle delivering the commodity. The information management center modifies the course information regarding the vehicle so that the vehicle passes through the rendezvous point, modifies the course information regarding the delivery vehicle so that the delivery vehicle passes through the rendezvous point, and sends notifications to the vehicle and the delivery vehicle. When the vehicle and the delivery vehicle arrive at the rendezvous point, the orderer can receive the commodity.

Patent Reference 1: Japanese Patent Application Publication No. 2012-121700

In the technology described above, the vehicle (hereinafter referred to as a "receiving-side mobile object") needs to move to the rendezvous point (i.e., receiving spot). However, when the receiving-side mobile object has to move to the receiving spot, for example, a schedule (e.g., moving schedule, shopping schedule, etc.) of a user riding in the receiving-side mobile object is altered forcibly. Therefore, it is undesirable to make the receiving-side mobile object move to the receiving spot.

SUMMARY OF THE INVENTION

An object of the present disclosure is to let the user receive the commodity without becoming conscious of the receiving spot.

An information processing device according to an aspect of the present disclosure is provided. The information processing device includes an acquisition unit that acquires map information, position information on a first mobile object as a mobile object capable of moving by means of manual driving or autonomous driving, and position information on a second mobile object as a mobile object capable of carrying a parcel and moving by means of autonomous driving, a generation unit that generates course information regarding the second mobile object based on the map information, the position information on the first mobile object, and the position information on the second mobile object, and a control unit that performs control based on the course information regarding the second mobile object on the second mobile object.

According to the present disclosure, the user can receive the commodity without becoming conscious of the receiving spot.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 14 is a diagram showing an example of a score table in the third embodiment;

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
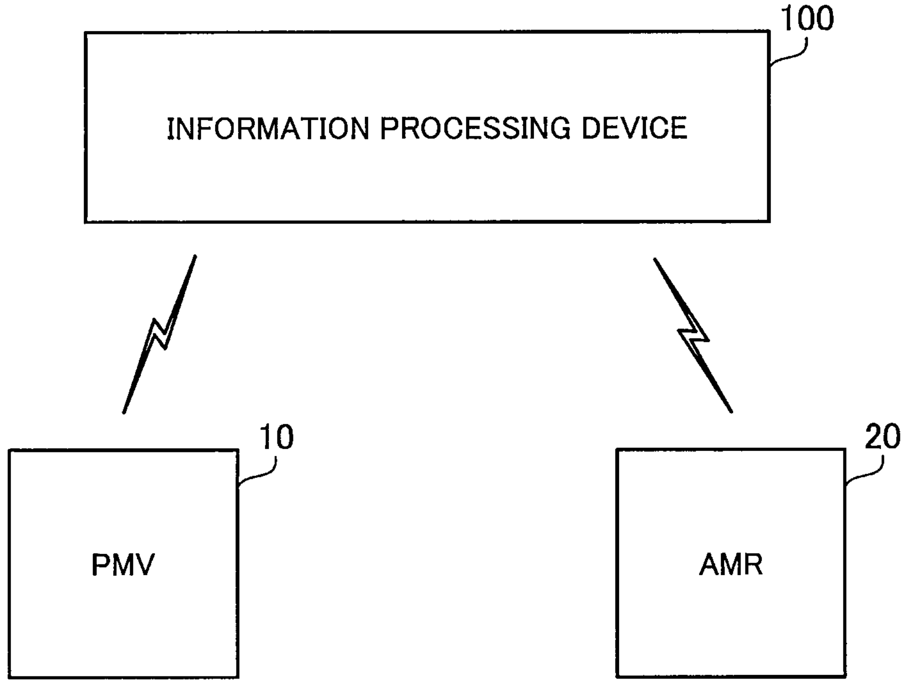
FIG. 1 is a diagram showing a delivery system in a first embodiment.

FIG. 1 is a diagram showing a delivery system in a first embodiment. The delivery system includes an information processing device 100, a first mobile object and a second mobile object.

The first mobile object is a mobile object capable of moving by means of manual driving or autonomous driving. For example, the first mobile object is a Personal Mobility Vehicle (PMV) 10. Further, the first mobile object is a receiving-side mobile object.

The second mobile object is a mobile object capable of carrying a parcel and moving by means of autonomous driving. For example, the second mobile object is an Autonomous Mobile Robot (AMR). Further, the parcel is a commodity, for example.

In the following description, the first mobile object is assumed to be the PMV 10. The second mobile object is assumed to be an AMR 20.

The information processing device 100, the PMV 10 and the AMR 20 execute communication via a network. The network is a wireless network.

The information processing device 100 is a device that executes a control method. The information processing device 100 is a server, for example.

Next, a process executed by the delivery system will be described briefly below by using a concrete example.

Figure 2:
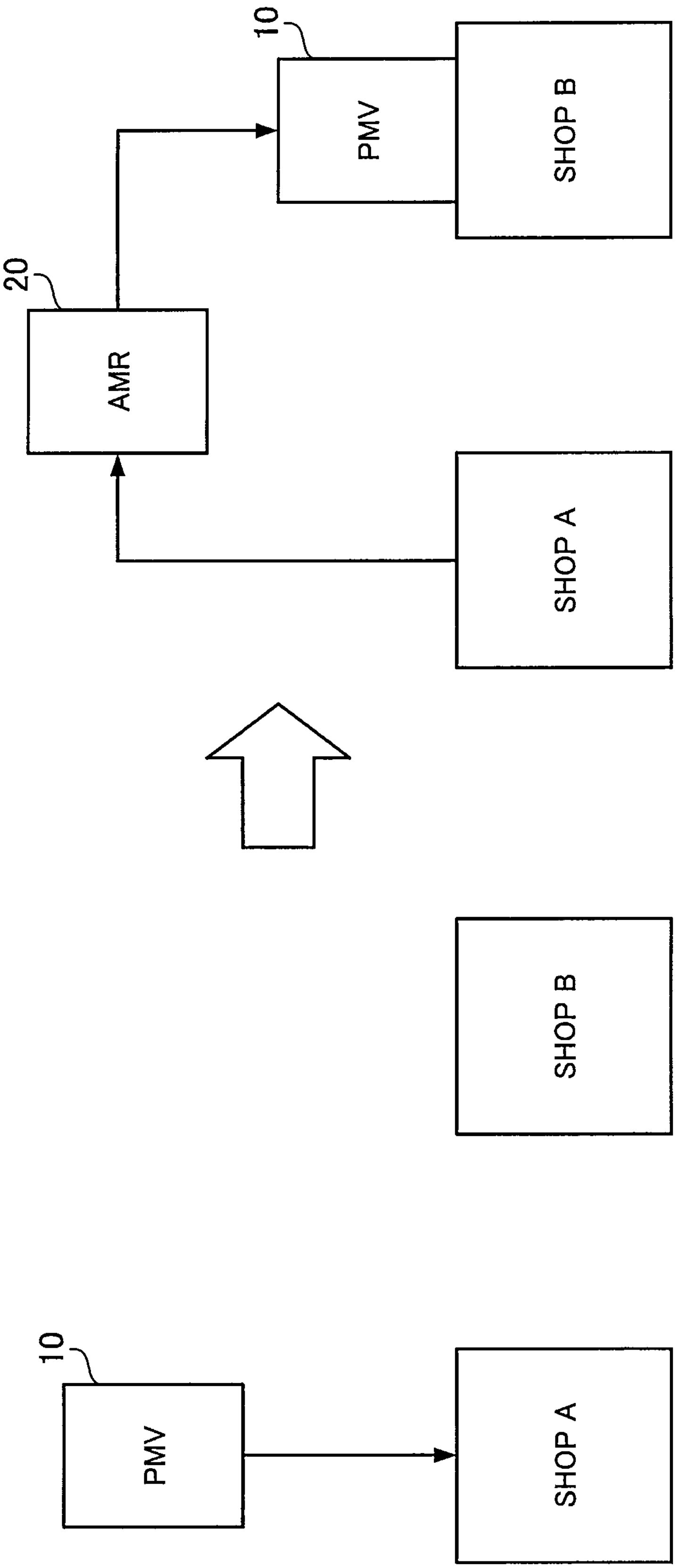
FIG. 2 is a diagram showing a concrete example of a process executed by the delivery system in the first embodiment.

FIG. 2 is a diagram showing a concrete example of the process executed by the delivery system in the first embodiment. FIG. 2 indicates shops A and B. For example, each shop A, B can be a supermarket, a restaurant, a drugstore, or the like.

A user riding in the PMV 10 places an order with the shop A for a commodity. Incidentally, the user may place the order for the commodity via a paper medium or orally. Further, the user may also place the order for the commodity by using a terminal such as a smartphone. After finishing placing the order, the user rides in the PMV 10 and moves to the shop B.

The AMR 20 is placed at the shop A. A clerk of the shop A stores the commodity in the AMR 20. A clerk of the shop A transmits a commodity delivery request to the information processing device 100 by using a terminal of the shop A. The information processing device 100 transmits course information to the AMR 20. Incidentally, the course information is information for making the AMR 20 move to the position of the PMV 10. The AMR 20 moves to the position of the PMV 10 based on the course information. The AMR 20 arrives at the position of the PMV 10. The user receives the commodity.

As above, the information processing device 100 does not control the PMV 10. Therefore, the user riding in the PMV 10 can receive the commodity without becoming conscious of the receiving spot.

Incidentally, the above-described example is one example of the process executed by the delivery system.

The information processing device 100 will be described in detail below. First, hardware included in the information processing device 100 will be described below.

Figure 3:
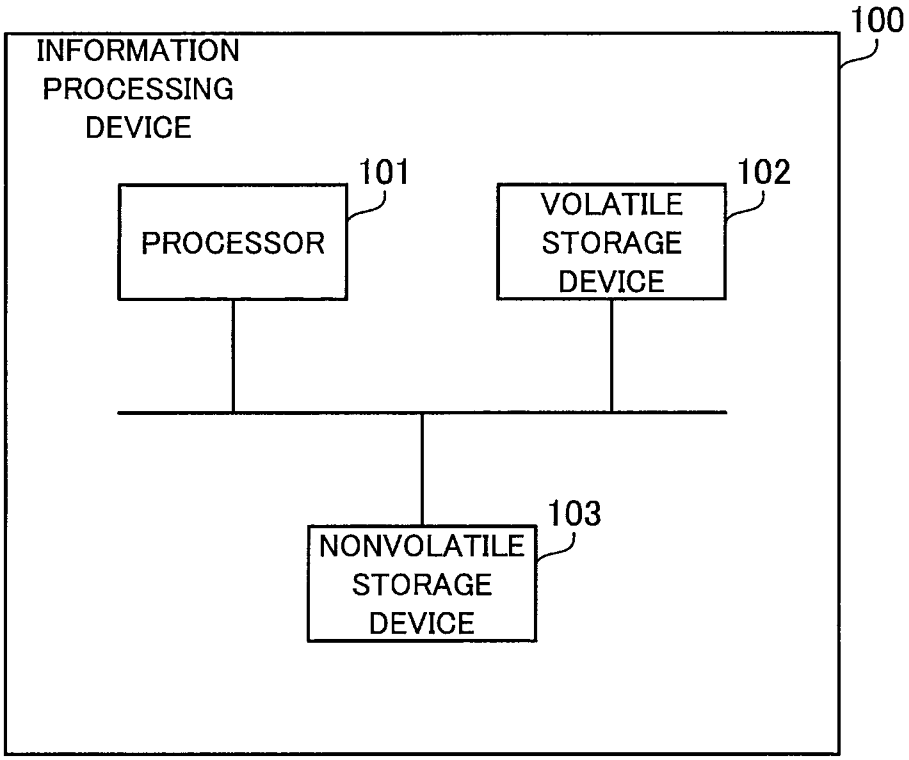
FIG. 3 is a diagram showing hardware included in an information processing device in the first embodiment.

FIG. 3 is a diagram showing the hardware included in the information processing device in the first embodiment. The information processing device 100 includes a processor 101, a volatile storage device 102 and a nonvolatile storage device 103.

The processor 101 controls the whole of the information processing device 100. The processor 101 is a Central Processing Unit (CPU), a Field Programmable Gate Array (FPGA) or the like, for example. The processor 101 can also be a multiprocessor. Further, the information processing device 100 may include processing circuitry.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Next, functions of the information processing device 100 will be described below.

Figure 4:
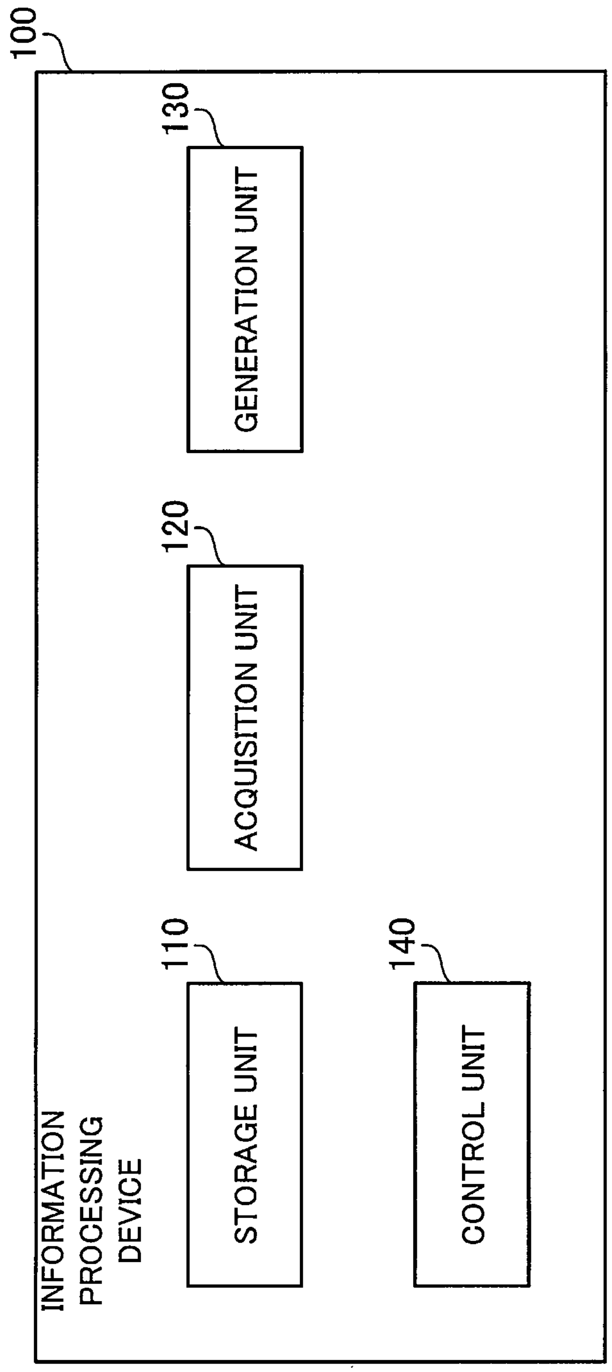
FIG. 4 is a block diagram showing functions of the information processing device in the first embodiment.

FIG. 4 is a block diagram showing the functions of the information processing device in the first embodiment. The information processing device 100 includes a storage unit 110, an acquisition unit 120, a generation unit 130 and a control unit 140.

The storage unit 110 may be implemented as a storage area reserved in the volatile storage device 102 or the nonvolatile storage device 103.

Part or all of the acquisition unit 120, the generation unit 130 and the control unit 140 may be implemented by processing circuitry. Further, part or all of the acquisition unit 120, the generation unit 130 and the control unit 140 may be implemented as modules of a program executed by the processor 101. For example, the program executed by the processor 101 is referred to also as a control program. The control program has been recorded in a record medium, for example.

The storage unit 110 stores a variety of information.

The acquisition unit 120 acquires the commodity delivery request. For example, the acquisition unit 120 acquires the commodity delivery request from a terminal of a shop as a delivery source.

The acquisition unit 120 acquires map information. For example, the acquisition unit 120 acquires the map information from the storage unit 110. Further, for example, the acquisition unit 120 acquires the map information from an external device. Incidentally, the external device is a device capable of connecting to the information processing device 100. For example, the external device is a cloud server. Illustration of the external device is left out. For example, the map information includes information regarding passages such as road shapes, road widths, intersections, staircases, crosswalks, pedestrian roads (e.g., pedestrian deck), places crowded with pedestrians, street lights, and arcades and information regarding facilities such as shops, stations and public squares.

The acquisition unit 120 acquires position information on the PMV 10 from the PMV 10. It is also possible for the acquisition unit 120 to acquire the position information on the PMV 10 from the PMV 10 via another device.

The acquisition unit 120 acquires position information on the AMR 20 from the AMR 20. It is also possible for the acquisition unit 120 to acquire the position information on the AMR 20 from the AMR 20 via another device.

The generation unit 130 generates the course information regarding the AMR 20 based on the map information, the position information on the PMV 10 and the position information on the AMR 20. Incidentally, the course indicated by the course information regarding the AMR 20 is desired to be the shortest course for the AMR 20 to move from a position indicated by the position information on the AMR 20 to a position indicated by the position information on the PMV 10.

The control unit 140 performs control based on the course information regarding the AMR 20 on the AMR 20. For example, the control unit 140 transmits the course information regarding the AMR 20 and a command indicating movement based on the course information regarding the AMR 20 to the AMR 20. It is also possible for the control unit 140 to transmit the course information regarding the AMR 20 and the command to the AMR 20 via another device. Accordingly, the AMR 20 moves based on the course information regarding the AMR 20. The control unit 140 may also transmit a destination based on the course information to the AMR 20 as needed.

Further, the control unit 140 executes a process of judging whether the AMR 20 has joined up with the PMV 10 or not based on the position information on the PMV 10 acquired again and the position information on the AMR 20 acquired again after the course information regarding the AMR 20 is generated. In other words, the control unit 140 executes the process of judging whether the AMR 20 has joined up with the PMV 10 or not based on the position information on the PMV 10 acquired again and the position information on the AMR 20 acquired again after the control of the AMR 20 is executed.

Next, a process executed by the information processing device 100 will be described below by using a flowchart.

Figure 5:
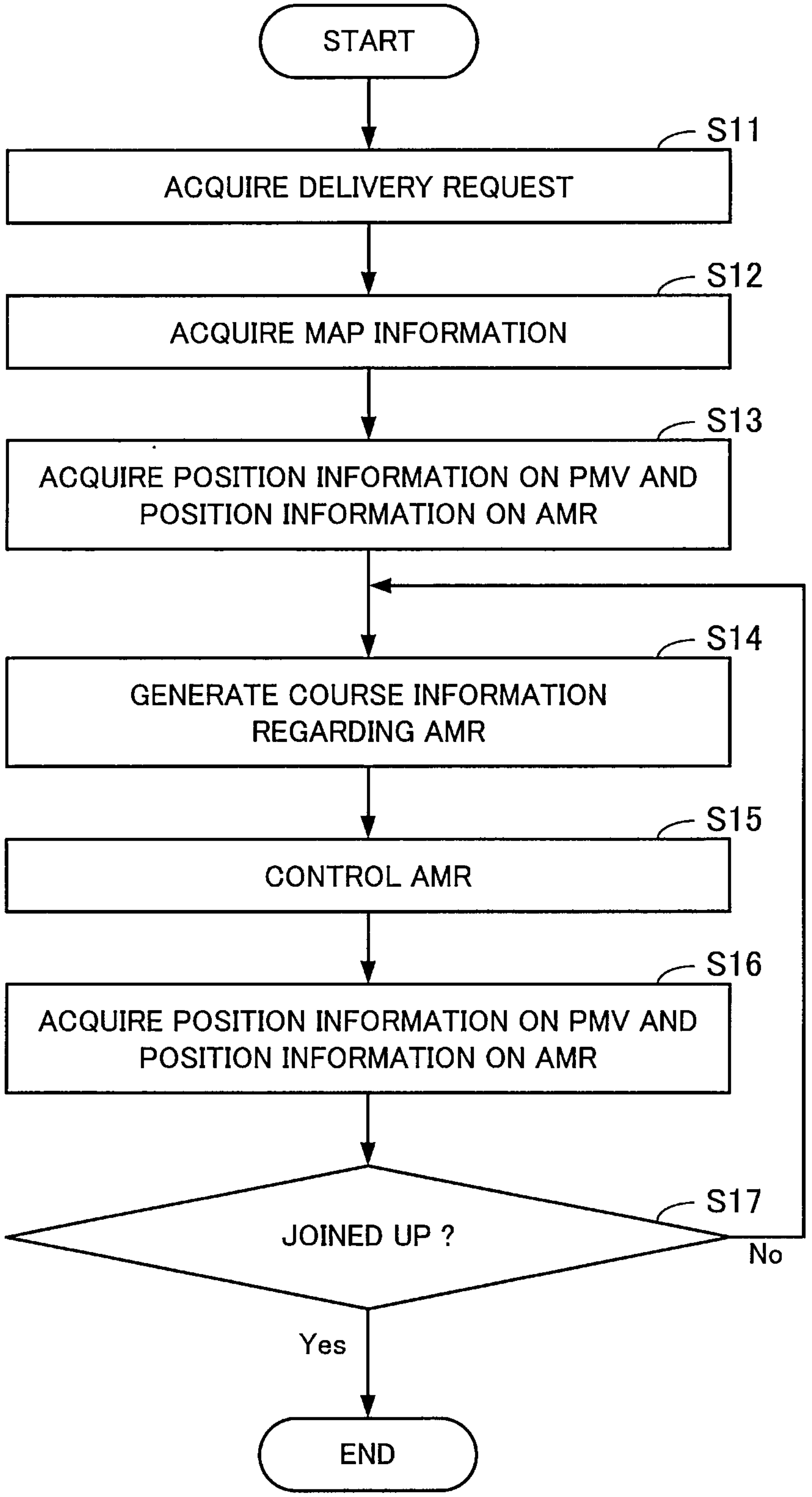
FIG. 5 is a flowchart showing an example of a process executed by the information processing device in the first embodiment.

FIG. 5 is a flowchart showing an example of the process executed by the information processing device in the first embodiment. Here, the AMR 20 is assumed to exist at the delivery source (e.g., the shop A).

(Step S11) The acquisition unit 120 acquires the commodity delivery request.

(Step S12) The acquisition unit 120 acquires the map information.

(Step S13) The acquisition unit 120 acquires the position information on the PMV 10 and the position information on the AMR 20.

(Step S14) The generation unit 130 generates the course information regarding the AMR 20 based on the map information, the position information on the PMV 10, and the position information on the AMR 20.

(Step S15) The control unit 140 performs the control based on the course information regarding the AMR 20 on the AMR 20. Accordingly, the AMR 20 moves based on the course information regarding the AMR 20.

(Step S16) After the elapse of a predetermined time, the acquisition unit 120 acquires the position information on the PMV 10 and the position information on the AMR 20. Incidentally, the predetermined time is a time sufficiently shorter than a time necessary for the AMR 20 to arrive at the position indicated by the position information on the PMV 10.

(Step S17) The control unit 140 judges whether the PMV 10 and the AMR 20 have joined up or not based on the position information on the PMV 10 and the position information on the AMR 20. For example, the control unit 140 judges that the PMV 10 and the AMR 20 have joined up if the position indicated by the position information on the PMV 10 and the position indicated by the position information on the AMR 20 are the same as each other. Further, for example, the control unit 140 judges that the PMV 10 and the AMR 20 have not joined up if the distance between the position indicated by the position information on the PMV 10 and the position indicated by the position information on the AMR 20 is greater than or equal to a threshold value. Here, the threshold value is, for example, a distance at which the user riding in the PMV 10 has no problem in receiving the parcel stored in the AMR 20.

When the PMV 10 and the AMR 20 have joined up, the process ends. Incidentally, when the PMV 10 and the AMR 20 have joined up, the information processing device 100 judges that the user has received the parcel.

When the PMV 10 and the AMR 20 have not joined up, the process advances to the step S14.

Further, when the AMR 20 is approaching the PMV 10, the control unit 140 may transmit an advance notice to the PMV 10. For example, the advance notice is a notification indicating that the parcel will arrive soon. Specifically, the information processing device 100 executes the following process. The acquisition unit 120 acquires the position information on the PMV 10 and the position information on the AMR 20 after the course information regarding the AMR 20 is generated. In other words, the acquisition unit 120 acquires the position information on the PMV 10 and the position information on the AMR 20 after the control of the AMR 20 is executed. When the distance between the position indicated by the position information on the PMV 10 and the position indicated by the position information on the AMR 20 is less than or equal to a predetermined threshold value, the control unit 140 transmits the advance notice to the PMV 10. That is, when the distance between the position indicated by the position information on the PMV 10 acquired in the step S16 and the position indicated by the position information on the AMR 20 acquired in the step S16 is less than or equal to the threshold value, the control unit 140 transmits the advance notice to the PMV 10. By this advance notice, the user riding in the PMV 10 can recognize that the parcel will arrive soon. Here, the threshold value is, for example, a distance in a range in which the user riding in the PMV 10 is capable of viewing the AMR 20 or a distance slightly longer than the distance in the range.

Furthermore, when the AMR 20 does not join up with the PMV 10 within a predetermined time, the control unit 140 may control the AMR 20 so that the AMR 20 moves at a speed higher than present speed of the AMR 20 and joins up with the PMV 10. For example, when the AMR 20 does not join up with the PMV 10 within a predetermined time since the time when the course information regarding the AMR 20 was transmitted to the AMR 20, the control unit 140 transmits a command so that the AMR 20 moves at a speed higher than present speed of the AMR 20. Upon receiving the command, the AMR 20 raises speed of the AMR 20. Accordingly, the AMR 20 is capable of immediately joining up with the PMV 10.

According to the first embodiment, the information processing device 100 does not control the PMV 10. Therefore, the user riding in the PMV 10 can receive the parcel without becoming conscious of the receiving spot.

Further, in cases where the first mobile object and the second mobile object are small-sized mobile objects such as a PMV and an AMR, the user can receive the parcel in a narrow region.

Modification of First Embodiment

In the first embodiment, the description has given of the case where the AMR 20 exists at the delivery source. When the AMR 20 does not exist at the delivery source, the AMR 20 needs to go to the delivery source to pick up the parcel. In a modification of the first embodiment, a description will be given of such a case.

A process executed by the information processing device 100 will be described below by using a flowchart.

Figure 6:
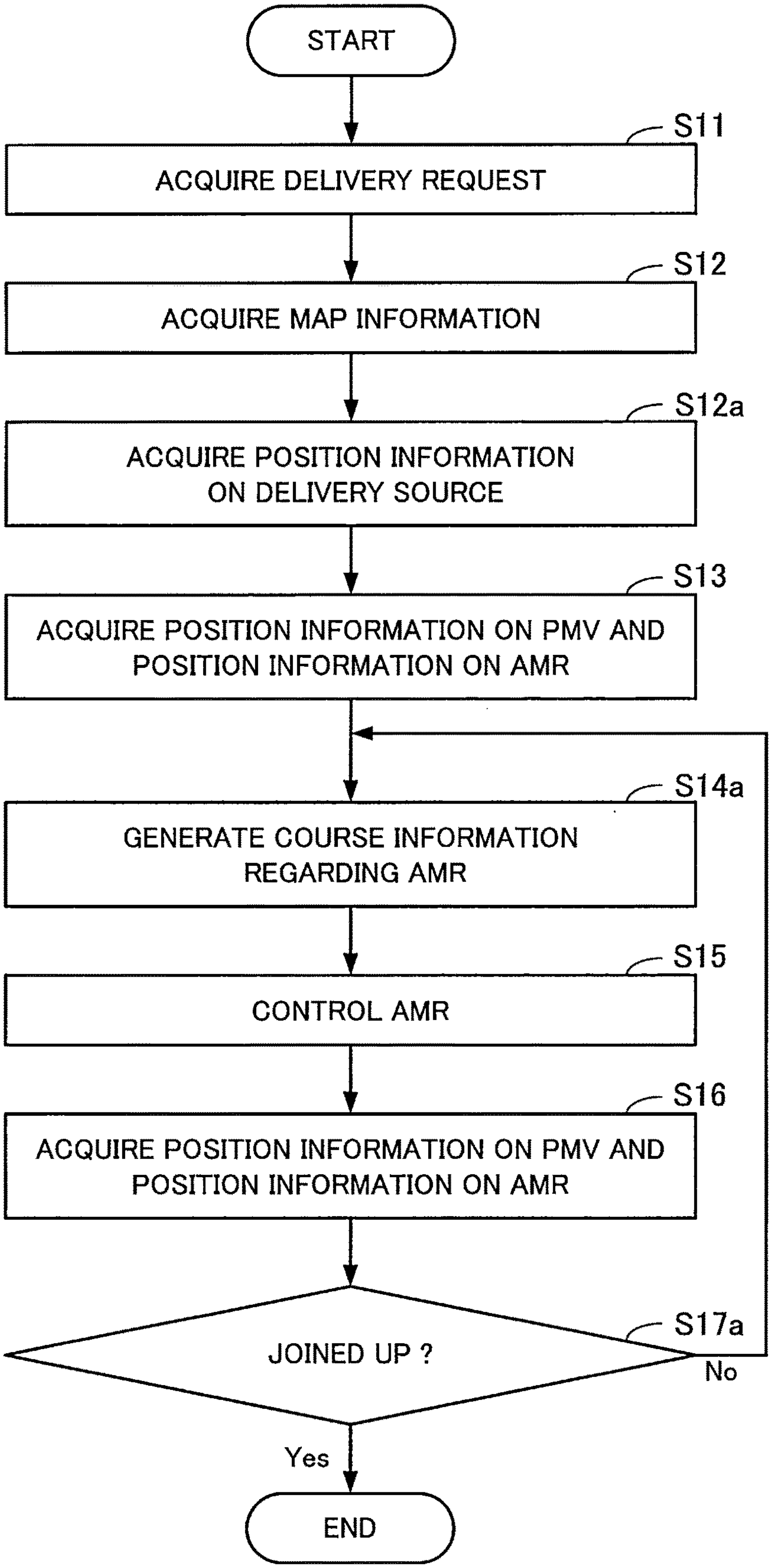
FIG. 6 is a flowchart showing an example of a process executed by an information processing device in a modification of the first embodiment.

FIG. 6 is a flowchart showing an example of the process executed by the information processing device in the modification of the first embodiment. The process in FIG. 6 differs from the process in FIG. 5 in that steps S12*a*, S14*a* and S17*a* are executed. Thus, the steps S12*a*, S14*a* and S17*a* in FIG. 6 will be described below. Then, the description will be omitted for processing other than the steps S12*a*, S14*a* and S17*a*.

(Step S12*a*) The acquisition unit 120 acquires position information on the delivery source of the parcel. For example, the acquisition unit 120 acquires the position information on the delivery source from the storage unit 110 or an external device.

(Step S14*a*) The generation unit 130 generates the course information regarding the AMR 20 based on the map information, the position information on the delivery source, the position information on the PMV 10, and the position information on the AMR 20. The course information indicates a course for the AMR 20 to move from the present position of the AMR 20 to the position of the delivery source and move from the position of the delivery source to the present position of the PMV 10.

(Step S17*a*) The control unit 140 judges whether the PMV 10 and the AMR 20 have joined up or not based on the position information on the PMV 10 and the position information on the AMR 20.

If the PMV 10 and the AMR 20 have joined up, the process ends. If the PMV 10 and the AMR 20 have not joined up, the process advances to the step S14*a*. Incidentally, in the step S14*a*, when the AMR 20 has already moved to the delivery source, the generation unit 130 generates the course information regarding the AMR 20 so that the AMR 20 moves from the present position of the AMR 20 to the present position of the PMV 10.

By this process, the AMR 20 can move to the delivery source and acquire the parcel based on the course information.

According to the modification of the first embodiment, the AMR 20 is capable of moving to the delivery source and acquiring the parcel based on the course information regarding the AMR 20.

Second Embodiment

Next, a second embodiment will be described below. In the second embodiment, the description will be given mainly of features different from those in the first embodiment. In the second embodiment, the description is omitted for features in common with the first embodiment.

In the first embodiment, the description has given of the case where the AMR 20 approaches the PMV 10. When the PMV 10 is moving, for example, there is a possibility that the AMR 20 follows after the PMV 10 for a long time. Thus, in the second embodiment, a description will be given of a case where the AMR 20 gets ahead of the PMV 10.

Figure 7:
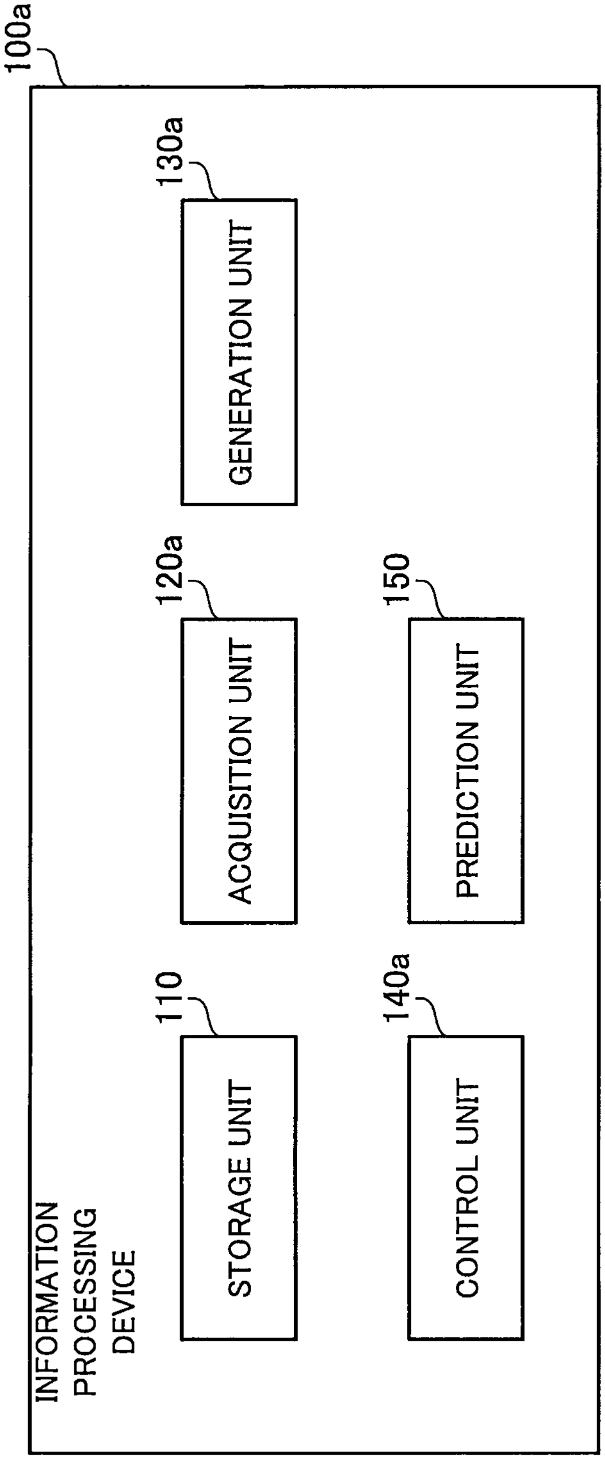
FIG. 7 is a block diagram showing functions of an information processing device in a second embodiment.

FIG. 7 is a block diagram showing functions of an information processing device in the second embodiment. The information processing device 100*a* includes an acquisition unit 120*a*, a generation unit 130*a*, a control unit 140*a* and a prediction unit 150.

Part or all of the acquisition unit 120*a*, the generation unit 130*a*, the control unit 140*a* and the prediction unit 150 may be implemented by processing circuitry. Further, part or all of the acquisition unit 120*a*, the generation unit 130*a*, the control unit 140*a* and the prediction unit 150 may be implemented as modules of a program executed by the processor 101.

The acquisition unit 120*a* acquires movement history records of the PMV 10 from the storage unit 110 or the external device.

The prediction unit 150 predicts a movement course of the PMV 10 by using the position information on the PMV 10, the map information, and the movement history records of the PMV 10. For example, the prediction unit 150 predicts a destination of the PMV 10 based on the map information and the movement history records of the PMV 10, and predicts a shortest course for the PMV 10 to move from the present position to the destination as the movement course of the PMV 10.

It is also possible for the prediction unit 150 to predict the movement course of the PMV 10 by using the position information on the PMV 10, the map information, the movement history records of the PMV 10, and information regarding the user riding in the PMV 10. For example, the information regarding the user can be attribute information (e.g., age, sex, and so forth), preference information, a shopping list, purchase history records in the past, the contents of postings to a Social Networking Service (SNS), or the like. Incidentally, the information regarding the user is acquired by the acquisition unit 120*a* from the storage unit 110 or the external device. The prediction unit 150 is capable of increasing the prediction accuracy of the movement course of the PMV 10 by using the information regarding the user.

Further, it is also possible for the prediction unit 150 to predict the movement course of the PMV 10 by using the position information on the PMV 10, the map information, the movement history records of the PMV 10, and a learned model. Incidentally, the learned model is acquired by the acquisition unit 120*a* from the storage unit 110 or the external device. The prediction unit 150 is capable of increasing the prediction accuracy of the movement course of the PMV 10 by using the learned model. Incidentally, the learned model can be obtained by means of machine learning.

Functions of the generation unit 130*a* and the control unit 140*a* will be described later.

Next, a delivery system in the second embodiment will be described below by using concrete examples.

Figure 8:
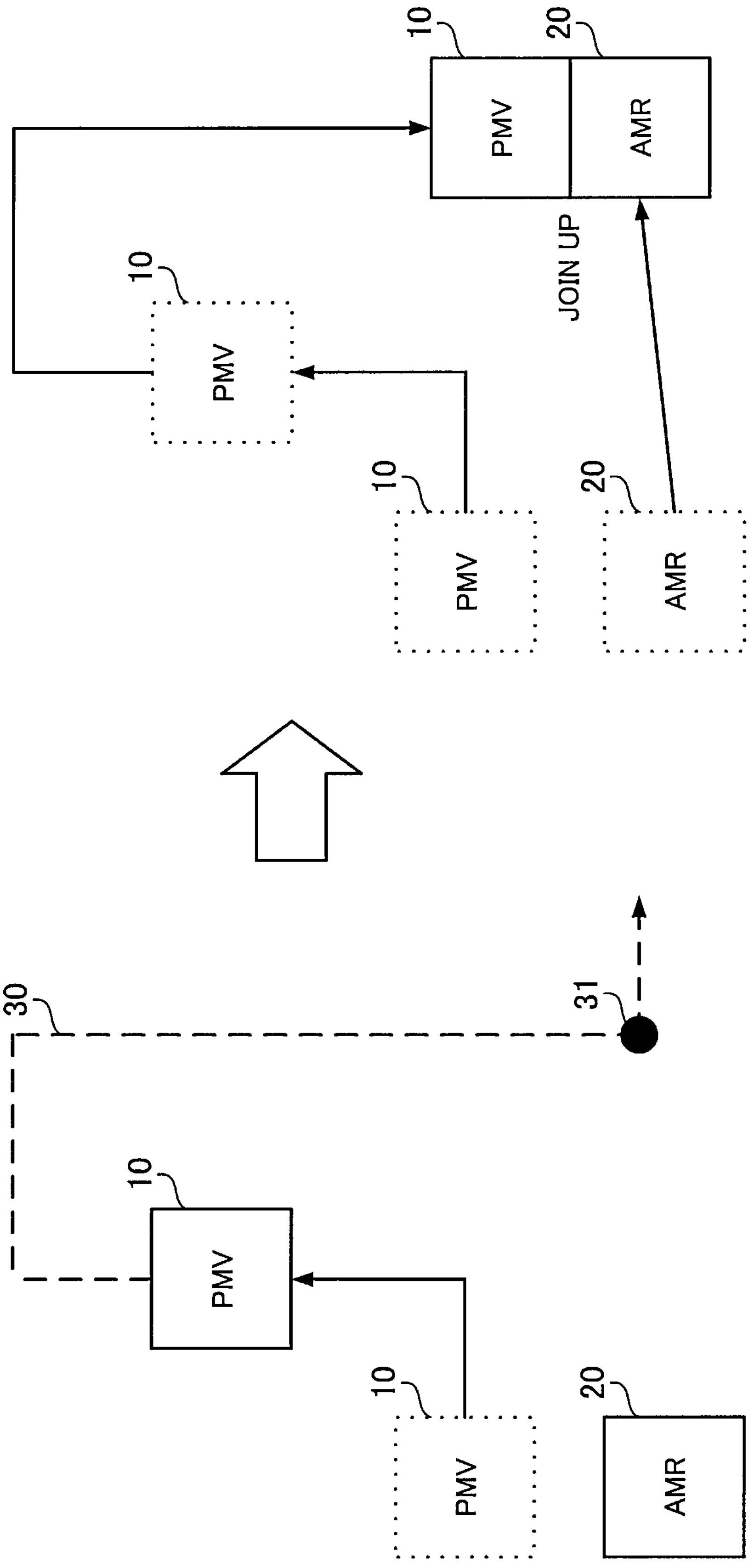
FIG. 8 is a diagram showing a concrete example (No. 1) of a delivery system in the second embodiment.

FIG. 8 is a diagram showing a concrete example (No. 1) of the delivery system in the second embodiment. FIG. 8 indicates a movement course 30 of the PMV 10. The information processing device 100*a* selects a get-ahead position 31 based on the movement course 30 of the PMV 10. Incidentally, the get-ahead position can be anywhere as long as it is on the movement course 30 of the PMV 10. When the AMR 20 is capable of getting ahead, the information processing device 100*a* generates course information for making the AMR 20 move to the get-ahead position 31. The AMR 20 moves based on the course information. Accordingly, the AMR 20 moves to the get-ahead position 31. The AMR 20 stays on standby at the get-ahead position 31. The PMV 10 arrives at the get-ahead position 31. The user receives the parcel.

Next, a process executed by the information processing device 100*a* will be described below by using a flowchart.

Figure 9:
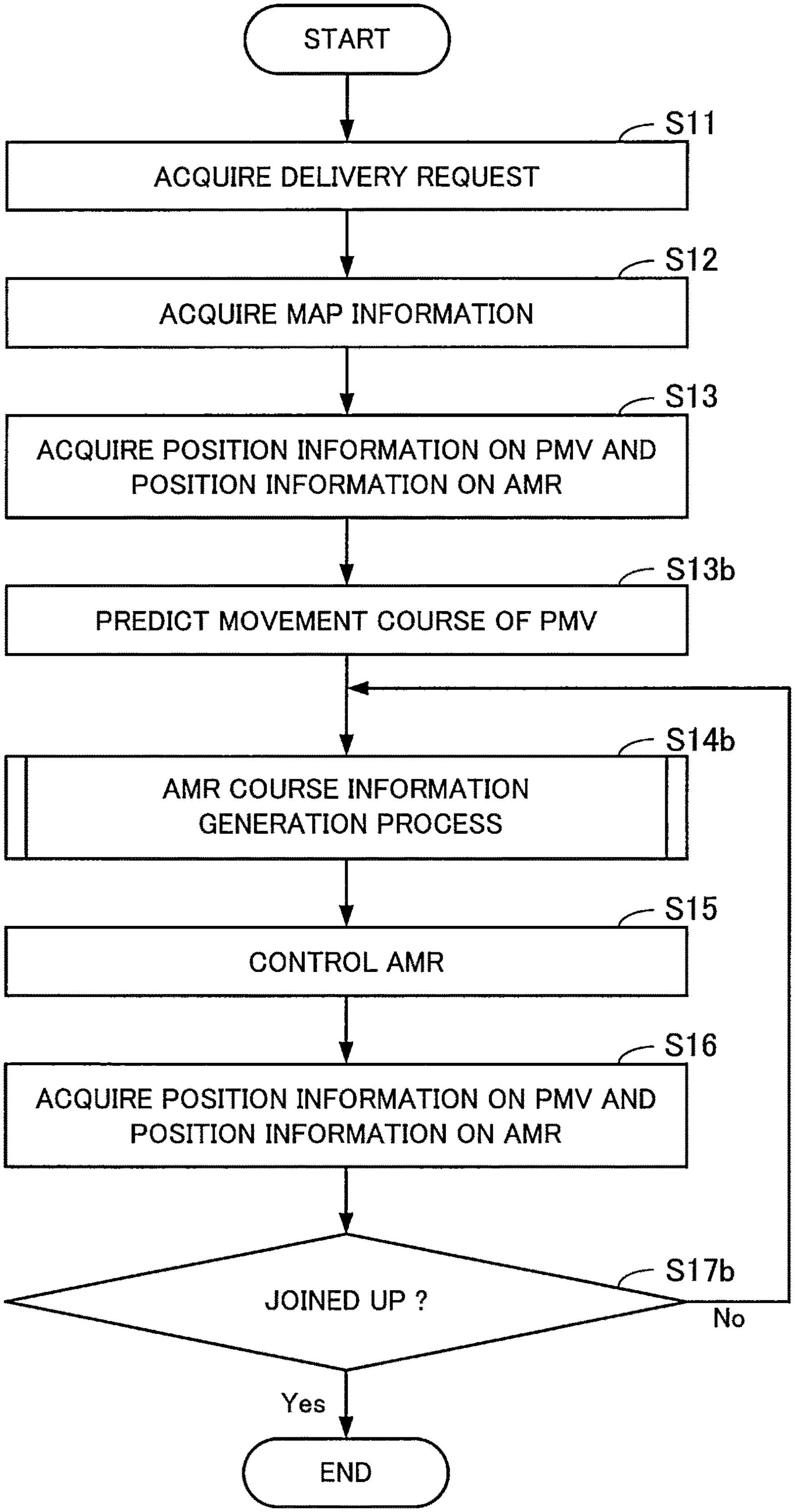
FIG. 9 is a flowchart showing an example of a process executed by an information processing device in the second embodiment.

FIG. 9 is a flowchart showing an example of the process executed by the information processing device in the second embodiment. The process in FIG. 9 differs from the process in FIG. 5 in that steps S13*b*, S14*b* and S17*b* are executed. Thus, the steps S13*b*, S14*b* and S17*b* in FIG. 9 will be described below. Then, the description will be omitted for processing other than the steps S13*b*, S14*b* and S17*b*. Further, it is assumed that the processes executed by the acquisition unit 120, the generation unit 130 and the control unit 140 are executed by the acquisition unit 120*a*, the generation unit 130*a* and the control unit 140*a*.

(Step S13*b*) The prediction unit 150 predicts the movement course of the PMV 10 by using the position information on the PMV 10, the map information, and the movement history records of the PMV 10.

(Step S14*b*) The acquisition unit 120*a*, the generation unit 130*a*, the control unit 140*a* and the prediction unit 150 execute the process of generating the course information regarding the AMR 20.

(Step S17*b*) The control unit 140*a* judges whether the PMV 10 and the AMR 20 have joined up or not based on the position information on the PMV 10 and the position information on the AMR 20.

If the PMV 10 and the AMR 20 have joined up, the process ends. If the PMV 10 and the AMR 20 have not joined up, the process advances to the step S14*b*.

Figure 10:
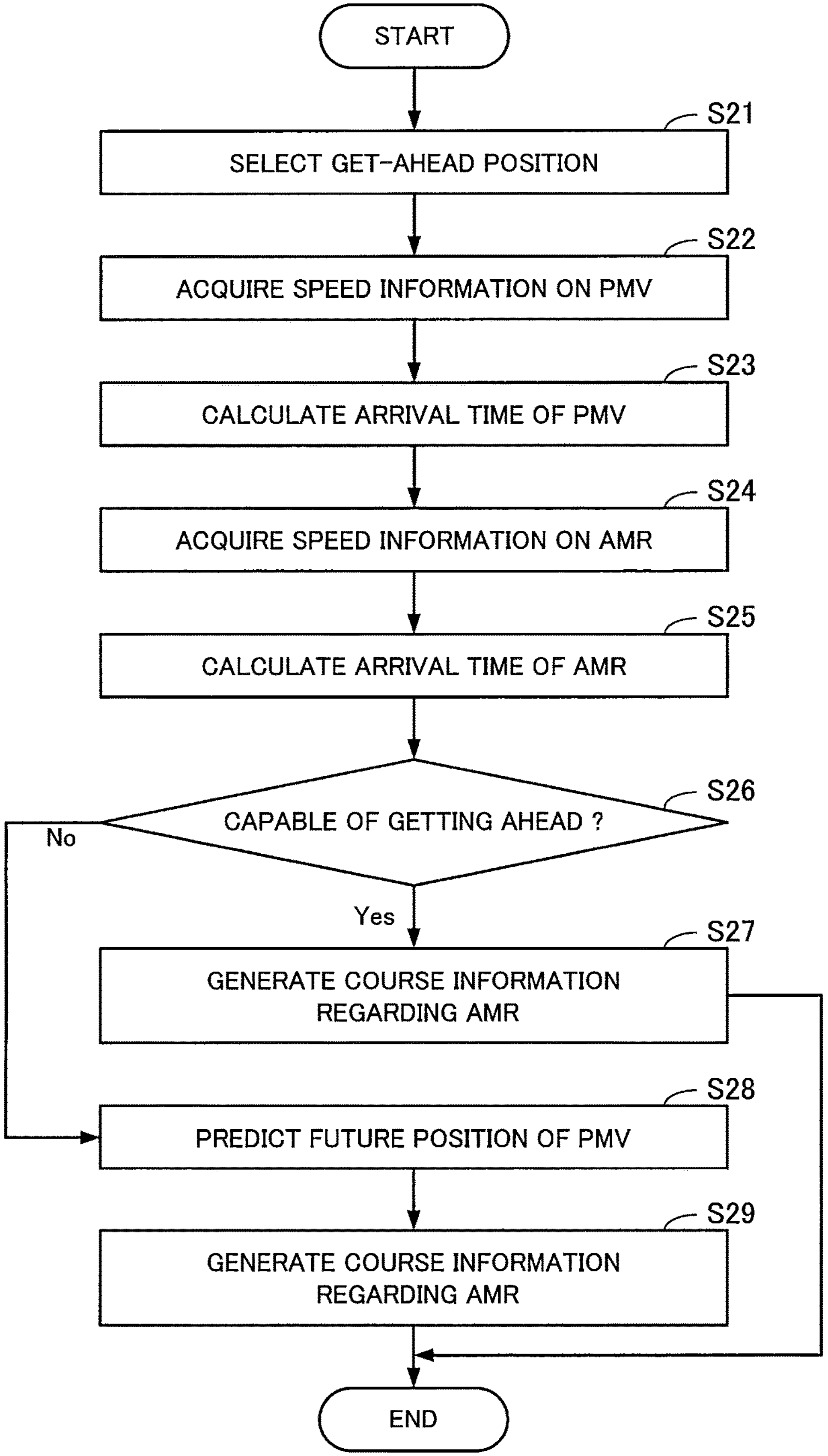
FIG. 10 is a flowchart showing an example of an AMR course information generation process in the second embodiment.

FIG. 10 is a flowchart showing an example of an AMR course information generation process in the second embodiment. The process in FIG. 10 corresponds to the step S14*b*.

(Step S21) The control unit 140*a* selects the get-ahead position based on the movement course of the PMV 10.

(Step S22) The acquisition unit 120*a* acquires speed information on the PMV 10. For example, the acquisition unit 120*a* acquires the speed information on the PMV 10 from the storage unit 110 or the external device. Incidentally, the speed information on the PMV 10 is, for example, information indicating a speed range possible for the PMV 10. The speed information on the PMV 10 can also be the present speed of the PMV 10. In the case where the speed information on the PMV 10 is the present speed of the PMV 10, the acquisition unit 120*a* may acquire the present speed of the PMV 10 from the PMV 10.

(Step S23) The control unit 140*a* calculates a distance to the get-ahead position based on the position information on the PMV 10 and the movement course of the PMV 10. The control unit 140*a* calculates a time when the PMV 10 arrives at the get-ahead position (hereinafter referred to as an arrival time of the PMV 10) by using the distance and the speed information on the PMV 10.

(Step S24) The acquisition unit 120*a* acquires speed information on the AMR 20. For example, the acquisition unit 120*a* acquires the speed information on the AMR 20 from the storage unit 110 or the external device. Incidentally, the speed information on the AMR 20 is, for example, information indicating a speed range possible for the AMR 20. Further, when the AMR 20 is moving, the speed information on the AMR 20 can also be the present speed of the AMR 20. In the case where the speed information on the AMR 20 is the present speed of the AMR 20, the acquisition unit 120*a* may acquire the present speed of the AMR 20 from the AMR 20.

(Step S25) The control unit 140*a* calculates a distance to the get-ahead position based on the position information on the AMR 20 and the map information. Incidentally, the distance is desired to be the shortest distance. The control unit 140*a* calculates a time when the AMR 20 arrives at the get-ahead position (hereinafter referred to as an arrival time of the AMR 20) by using the distance and the speed information on the AMR 20. In the calculation of the arrival time of the AMR 20, the control unit 140*a* is desired to calculate the arrival time of the AMR 20 by using a maximum speed indicated by the speed information on the AMR 20.

(Step S26) The control unit 140*a* judges whether the AMR 20 is capable of getting ahead or not based on the arrival time of the PMV 10 and the arrival time of the AMR 20. Specifically, the control unit 140*a* judges that the AMR 20 is capable of getting ahead if the arrival time of the AMR 20 is earlier than the arrival time of the PMV 10.

If the AMR 20 is capable of getting ahead, the process advances to step S27. If the AMR 20 is incapable of getting ahead, the process advances to step S28.

(Step S27) The generation unit 130*a* generates course information regarding the AMR 20 for making the AMR 20 move to the get-ahead position based on the map information, the position information on the AMR 20, and the get-ahead position. Incidentally, this course information indicates a course of the distance (e.g., the shortest distance) used in the step S25. Then, the process ends.

(Step S28) The prediction unit 150 predicts a future position of the PMV 10 based on the movement course of the PMV 10, the position information on the PMV 10, the speed information on the PMV 10, and a predetermined time.

(Step S29) The generation unit 130*a* generates course information regarding the AMR 20 for making the AMR 20 move to the future position of the PMV 10 based on the map information, the position information on the AMR 20, and the future position of the PMV 10.

Here, the PMV 10 and the AMR 20 when the steps S28 and S29 are executed will be described below by using a concrete example.

Figure 11:
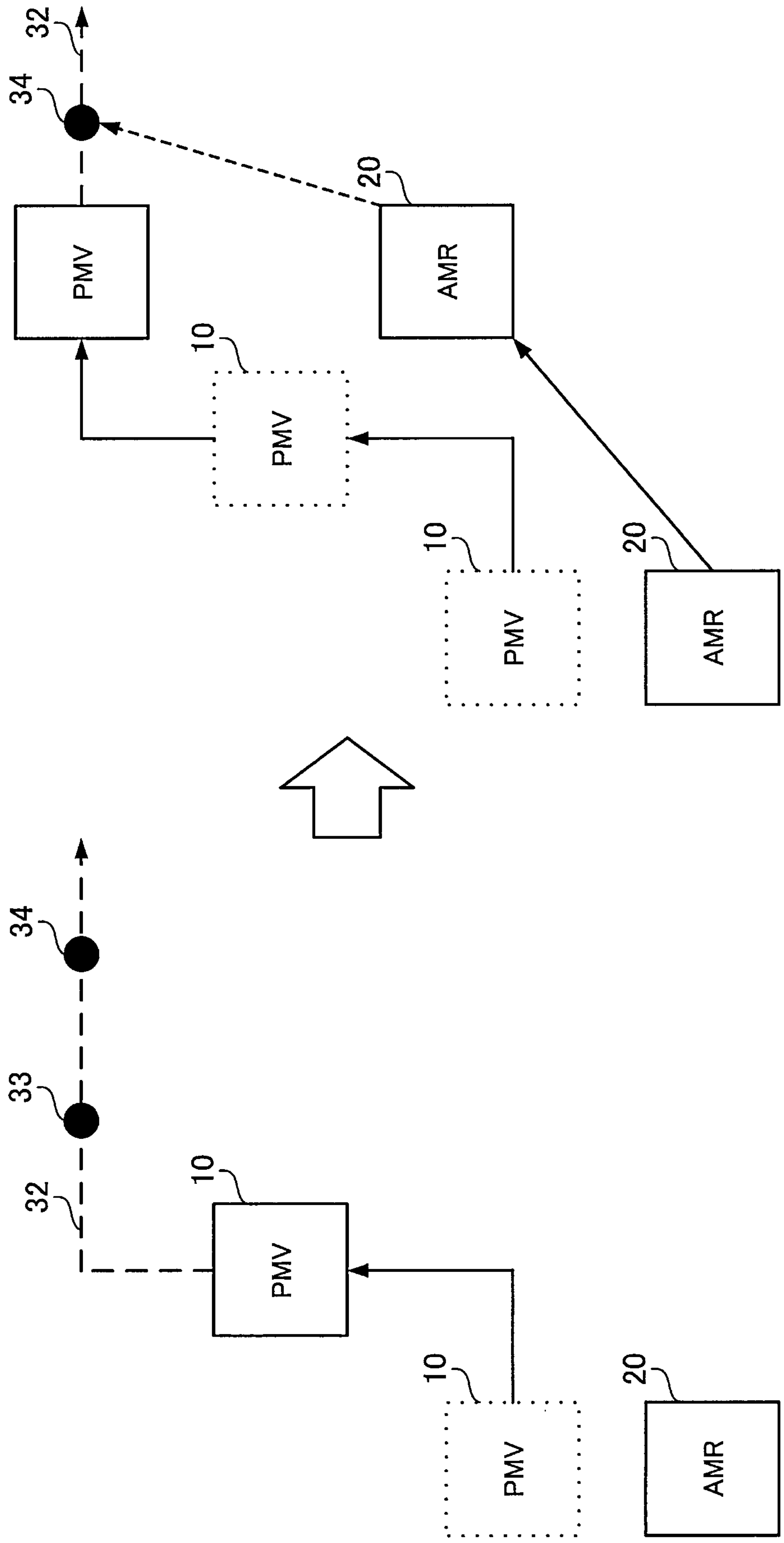
FIG. 11 is a diagram showing a concrete example (No. 2) of the delivery system in the second embodiment.

FIG. 11 is a diagram showing a concrete example (No. 2) of the delivery system in the second embodiment. FIG. 11 indicates the movement course 32 of the PMV 10. Further, FIG. 11 indicates the get-ahead position 33. Furthermore, FIG. 11 indicates the future position 34 of the PMV 10.

When the AMR 20 is incapable of getting ahead, the information processing device 100*a* generates course information for making the AMR 20 move to the position 34. The AMR 20 moves based on the course information. Accordingly, the AMR 20 starts moving towards the position 34.

The information processing device 100*a* is capable of making the AMR 20 move to the future position of the PMV 10 by executing the step S29. In other words, the information processing device 100*a* is capable of making the AMR 20 approach the PMV 10. Then, by making the AMR 20 move to the future position of the PMV 10, the AMR 20 can join up with the PMV 10 in a shorter time and a shorter travel distance compared to the case of making the AMR 20 move simply towards the present position of the PMV 10.

Further, when the step S15 is executed after the step S27, the control unit 140*a* may transmit a command to the AMR 20 so that the AMR 20 moves at the speed (e.g., the maximum speed) used in the step S25. Accordingly, the AMR 20 can move at the speed used in the step S25.

According to the second embodiment, when the AMR 20 is capable of getting ahead, the AMR 20 gets ahead and that enables the user to receive the parcel earlier.

Further, in the step S27, it is also possible for the generation unit 130*a* to generate course information regarding the AMR 20 for making the AMR 20 move to the get-ahead position and move in a direction opposite to a direction in which the PMV 10 moves along the movement course based on the map information, the movement course of the PMV 10, the position information on the AMR 20, and the get-ahead position. A concrete example will be described below.

Figure 12:
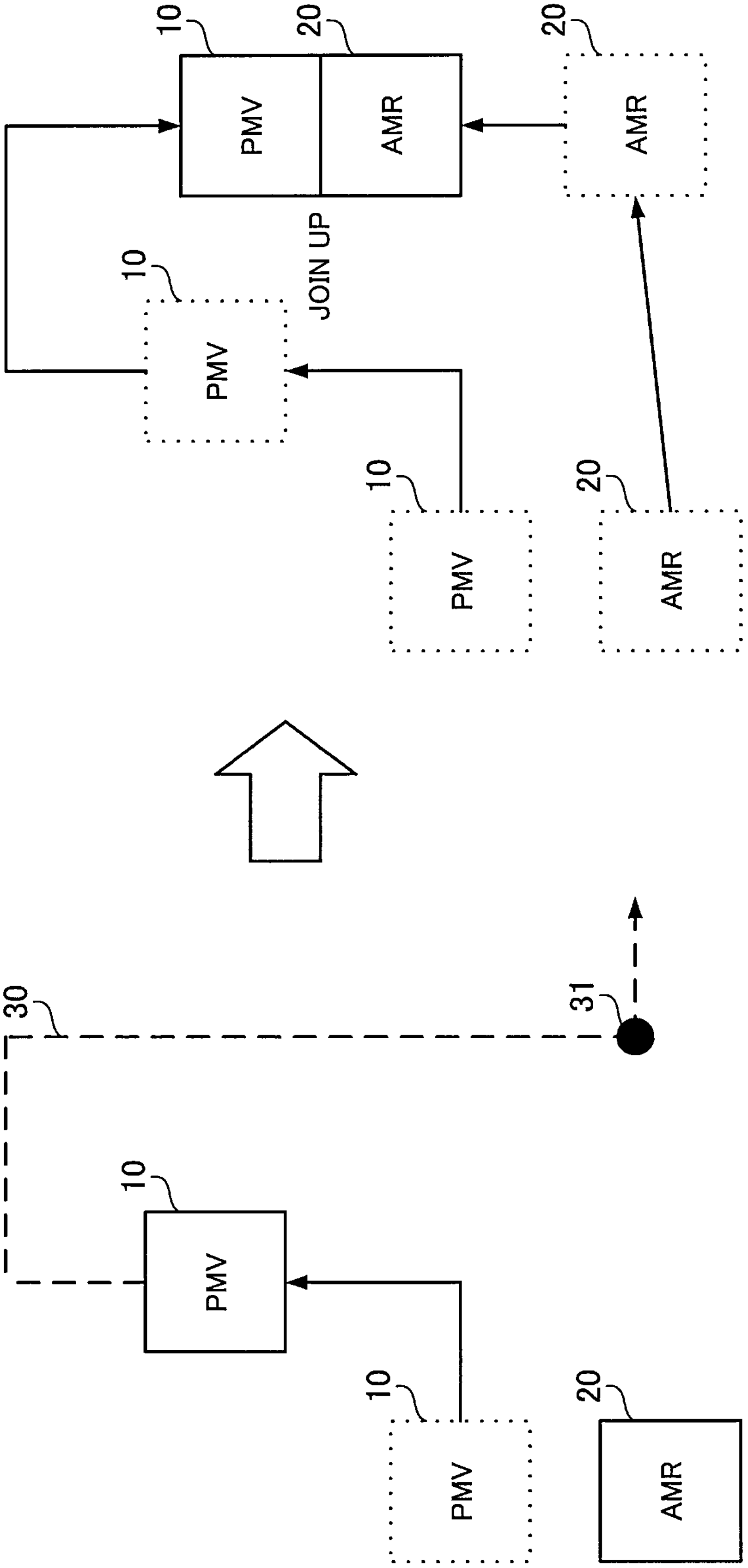
FIG. 12 is a diagram showing a concrete example (No. 3) of the delivery system in the second embodiment.

FIG. 12 is a diagram showing a concrete example (No. 3) of the delivery system in the second embodiment. The information processing device 100*a* generates the course information regarding the AMR 20 for making the AMR 20 move to the get-ahead position 31 and move in the direction opposite to the direction in which the PMV 10 moves along the movement course based on the map information, the movement course of the PMV 10, the position information on the AMR 20, and the get-ahead position. The AMR 20 moves to the get-ahead position 31 based on the course information. Then, the AMR 20 moves in the direction opposite to the direction in which the PMV 10 moves along the movement course. Accordingly, the user can receive the parcel earlier than in the case where the AMR 20 stays on standby at the get-ahead position 31.

Modification of Second Embodiment

In the second embodiment, the description has given of the case where the information processing device 100*a* predicts the movement course of the PMV 10. In a modification of the second embodiment, a description will be given of a case where the information processing device 100*a* does not predict the movement course of the PMV 10.

When the PMV 10 is moving by means of autonomous driving, the acquisition unit 120*a* acquires the movement course of the PMV 10 from the PMV 10.

By acquiring the movement course of the PMV 10 from the PMV 10 as above, the information processing device 100*a* is relieved of the need to execute the process of predicting the movement course of the PMV 10. Thus, according to the modification of the second embodiment, the processing load on the information processing device 100*a* is reduced.

Further, in the modification of the second embodiment, the information processing device 100*a* does not predict the movement course of the PMV 10. In the modification of the second embodiment, the rest of the processing is the same as that in the second embodiment.

Third Embodiment

Next, a third embodiment will be described below. In the third embodiment, the description will be given mainly of features different from those in the first embodiment. In the third embodiment, the description is omitted for features in common with the first embodiment.

There are cases where a join-up spot where the PMV 10 and the AMR 20 join up is unsuitable as a parcel handover spot. For example, there are cases where the join-up spot is on a crosswalk. Thus, in the third embodiment, a description will be given of a case where control is executed so that the join-up spot becomes a spot suitable as the parcel handover spot.

Figure 13:
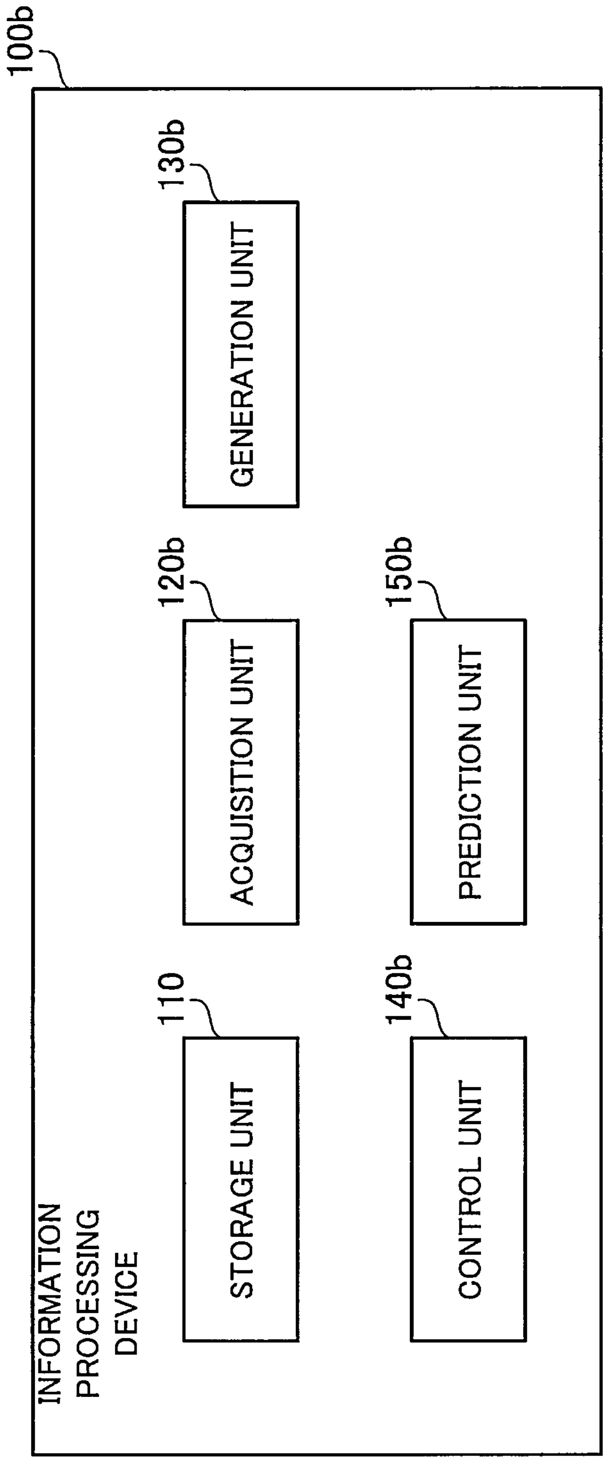
FIG. 13 is a block diagram showing functions of an information processing device in a third embodiment.

FIG. 13 is a block diagram showing functions of an information processing device in the third embodiment. The information processing device 100*b* includes an acquisition unit 120*b*, a generation unit 130*b*, a control unit 140*b* and a prediction unit 150*b*.

Part or all of the acquisition unit 120*b*, the generation unit 130*b*, the control unit 140*b* and the prediction unit 150*b* may be implemented by processing circuitry. Further, part or all of the acquisition unit 120*b*, the generation unit 130*b*, the control unit 140*b* and the prediction unit 150*b* may be implemented as modules of a program executed by the processor 101.

The acquisition unit 120*b* acquires the movement history records of the PMV 10 from the storage unit 110 or the external device.

The prediction unit 150*b* predicts the movement course of the PMV 10 by using the position information on the PMV 10, the map information, and the movement history records of the PMV 10.

The acquisition unit 120*b* acquires the speed information on the PMV 10 and the speed information on the AMR 20.

The prediction unit 150*b* predicts a join-up section by using the movement course of the PMV 10, the position information on the PMV 10, the position information on the AMR 20, the speed information on the PMV 10, and the speed information on the AMR 20. Incidentally, the join-up section is a section in which the PMV 10 and the AMR 20 join up.

The acquisition unit 120*b* acquires a score table from the storage unit 110 or the external device. Here, the score table will be shown below.

FIG. 14 is a diagram showing an example of the score table in the third embodiment. For example, the score table 111 has been stored in the storage unit 110. The score table 111 is referred to also as score information. The score table 111 indicates a score corresponding to a section. Further, the score table 111 can indicate a score corresponding to a section and indicate a score corresponding to the weather. Furthermore, the score table 111 can indicate a score corresponding to a section and indicate a score corresponding to a time slot. In more detail, the score table 111 includes items of place, score and remarks. A method of using the score table 111 will be described later.

The control unit 140*b* segments the join-up section. The control unit 140*b* identifies the score of each of a plurality of sections obtained by segmenting the join-up section by using the score table 111 and the map information.

Next, the score identification process will be described below by using concrete examples.

Figure 15:
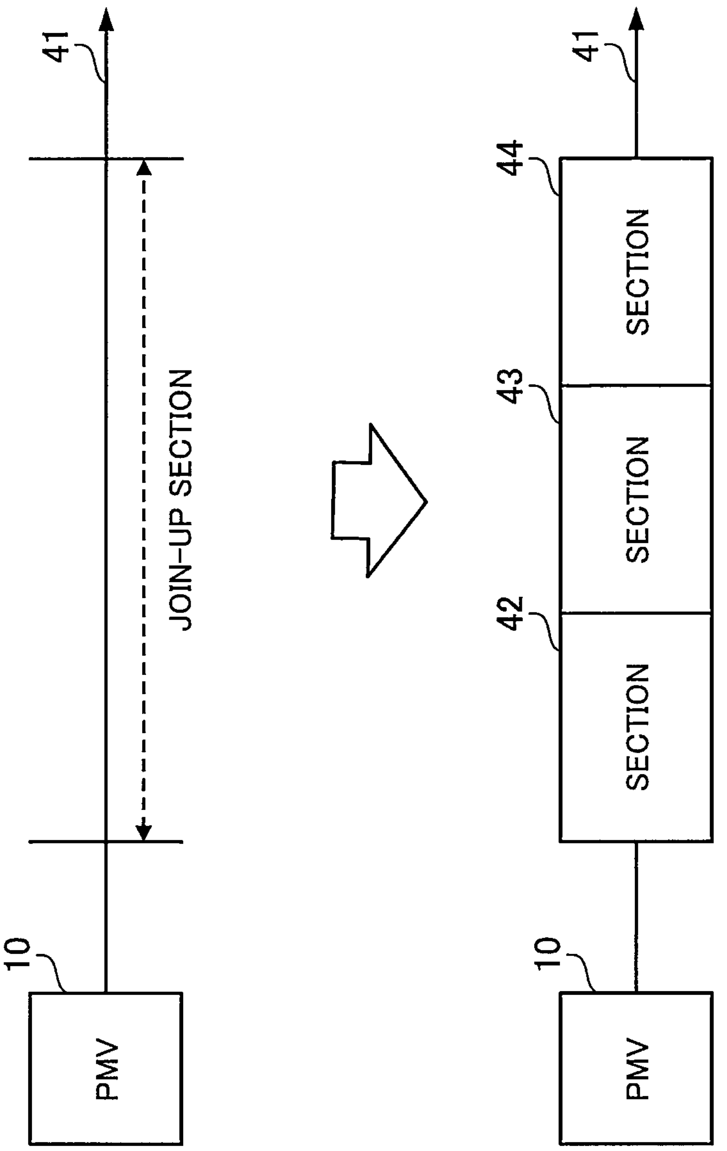
FIG. 15 is a diagram showing a concrete example of a score identification process in the third embodiment.

FIG. 15 is a diagram showing a concrete example of the score identification process in the third embodiment. FIG. 15 indicates the movement course 41 of the PMV 10. Further, FIG. 15 indicates the join-up section. The control unit 140*b* segments the join-up section. By the segmentation, the join-up section is segmented into sections 42 to 44.

The control unit 140*b* identifies based on the map information that the section 42 is a section in which a crosswalk exists. The section 42 is a section including a place where a vehicle should not stop. The control unit 140*b* identifies based on the map information that the section 43 is a section including a place where a roof exists. The control unit 140*b* identifies based on the map information that the section 44 is a section with a lot of foot traffic.

The control unit 140*b* identifies the score "−100" of the section 42 based on the score table 111. The control unit 140*b* identifies the score "10" of the section 43 based on the score table 111. The control unit 140*b* identifies the score "−20" of the section 44 based on the score table 111.

The control unit 140*b* determines the join-up spot based on the score of each of the plurality of sections. For example, the control unit 140*b* determines a section having the highest score among the scores of the plurality of sections as the join-up spot. For example, the control unit 140*b* determines the section 43 as the join-up spot.

The generation unit 130*b* generates the course information regarding the AMR 20 based on the map information, the join-up spot, and the position information on the AMR 20.

The control unit 140*b* calculates the speed of the AMR 20 for making the PMV 10 and the AMR 20 join up at the join-up spot by using the movement course of the PMV 10, the speed information on the PMV 10, and the course information regarding the AMR 20. For the calculation of the speed of the AMR 20, the control unit 140*b* may further use the position information on the PMV 10 and the position information on the AMR 20.

The control unit 140*b* performs control based on the course information regarding the AMR 20 on the AMR 20 and performs control on the AMR 20 so that the AMR 20 moves at the calculated speed. For example, the control unit 140*b* transmits the course information regarding the AMR 20, information indicating the speed of the AMR 20, a command indicating movement based on the course information regarding the AMR 20, and a command indicating movement based on the speed to the AMR 20. It is also possible for the control unit 140*b* to transmit the course information regarding the AMR 20 and so on to the AMR 20 via another device. Accordingly, the AMR 20 moves at the speed and moves to the join-up spot based on the course information regarding the AMR 20.

According to the third embodiment, the information processing device 100*b* is capable of making the AMR 20 move to the join-up spot. The join-up spot is a spot suitable as the parcel handover spot. Therefore, the user can receive the parcel at ease.

The information processing device 100*b* may execute the following process. The acquisition unit 120*b* acquires weather information. The control unit 140*b* identifies the score of each of the plurality of sections obtained by segmenting the join-up section by using the score table 111, the map information and the weather information. For example, the section 43 is assumed to be a section including a place where a roof exists such as an arcade. The weather information is assumed to indicate rain. The control unit 140*b* identifies the score "100" of the section 43. If the section 43 has a high score, the section 43 is determined as the join-up spot. When it's raining, the parcel receiving spot is desired to be a place where a roof exists. As above, thanks to the further use of the weather information, the user can receive the parcel at a comfortable place.

The information processing device 100*b* may execute the following process. The acquisition unit 120*b* acquires the present time. The control unit 140*b* identifies the score of each of the plurality of sections obtained by segmenting the join-up section by using the score table 111, the map information and the present time. For example, the section 43 is assumed to be a section including a bright place such as a place in the vicinity of a street light. The present time is assumed to indicate a time at night. The control unit 140*b* identifies the score "50" of the section 43. If the section 43 has a high score, the section 43 is determined as the join-up spot. In a time slot at night, the parcel receiving spot is desired to be a bright place. As above, thanks to the further use of the present time, the user can receive the parcel at a comfortable place.

The acquisition unit 120*b* may acquire preference information on the user. The control unit 140*b* may identify the score of each of the plurality of sections obtained by segmenting the join-up section by using the score table 111, the map information, and the preference information on the user. For example, the section 43 is a section including a place nearby the user's favorite shop. The control unit 140*b* identifies the score "30" of the section 43 by using the score table 111, the map information, and the preference information on the user. If the section 43 has a high score, the section 43 is determined as the join-up spot. When it can be seen from the preference information on the user that the user likes a particular shop, the parcel receiving spot is desired to be nearby the particular shop.

The section 43 can also be a section including a place far from a shop. The control unit 140*b* identifies the score "20" of the section 43 by using the score table 111, the map information, and the preference information on the user. If the section 43 has a high score, the section 43 is determined as the join-up spot. When it can be seen from the preference information on the user that the user desires to avoid the eyes of others, the parcel receiving spot is desired to be a place far from a shop.

As above, thanks to the further use of the preference information on the user, the user can receive the parcel at a comfortable place.

Modification of Third Embodiment

Next, a modification of the third embodiment will be described below. In the modification of the third embodiment, the description will be given mainly of features different from those in the second embodiment. In the modification of the third embodiment, the description is omitted for features in common with the second embodiment.

In the second embodiment, the get-ahead position has selected. In the modification of the third embodiment, a description will be given of a case where the get-ahead position is determined by using the score table 111. The determination process will be described below by using a flowchart.

Figure 16:
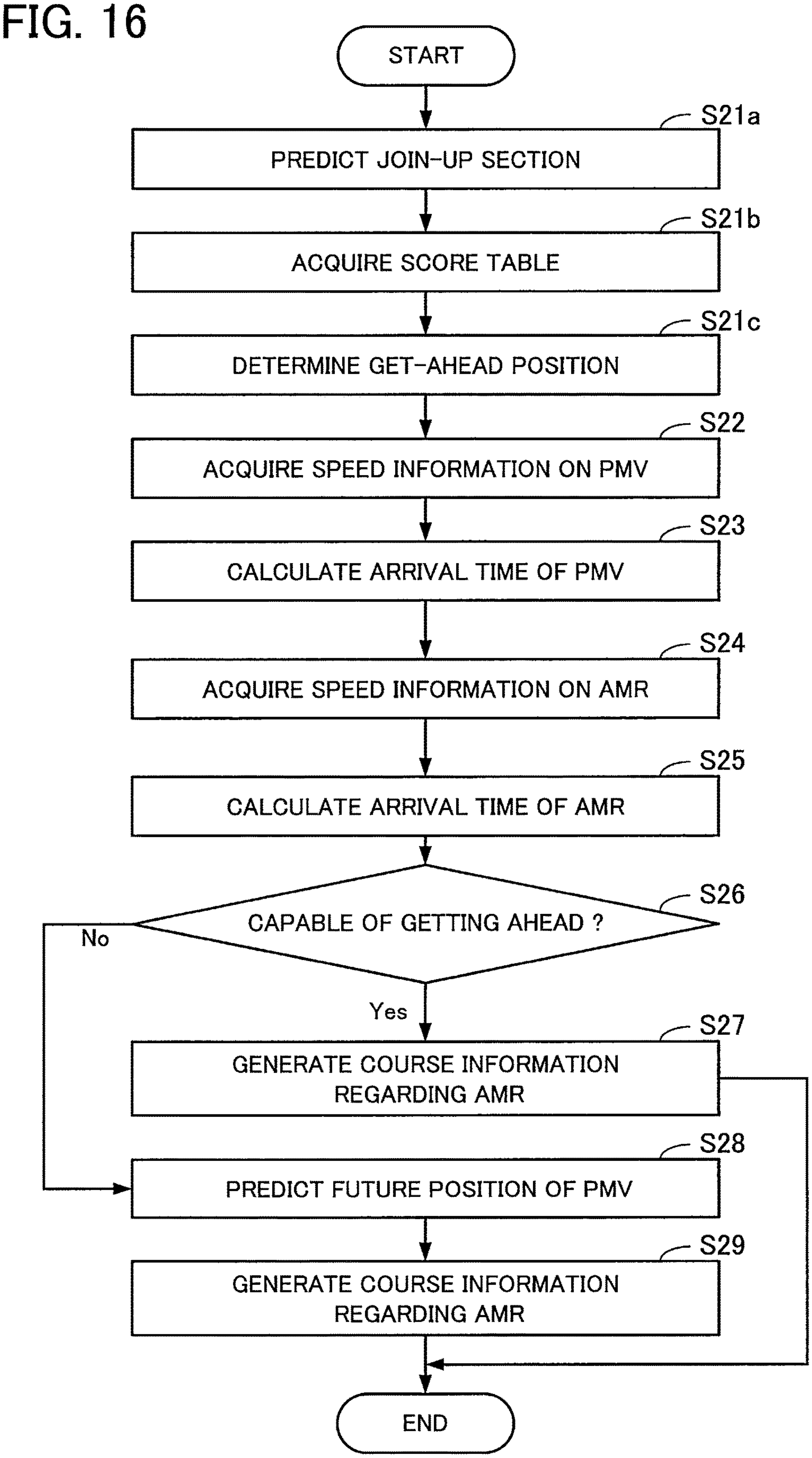
FIG. 16 is a flowchart showing an example of the AMR course information generation process in a modification of the third embodiment.

FIG. 16 is a flowchart showing an example of the AMR course information generation process in the modification of the third embodiment. The process in FIG. 16 corresponds to the step S14*b*.

Further, the process in FIG. 16 differs from the process in FIG. 10 in that steps S21*a* to S21*c* are executed. Thus, the steps S21*a* to S21*c* in FIG. 16 will be described below. Then, the description will be omitted for processing other than the steps S21*a* to S21*c*.

(Step S21*a*) The prediction unit 150 predicts the join-up section by using the movement course of the PMV 10, the position information on the PMV 10, the position information on the AMR 20, the speed information on the PMV 10, and the speed information on the AMR 20.

(Step S21*b*) The acquisition unit 120*a* acquires the score table 111 from the storage unit 110 or the external device.

(Step S21*c*) The control unit 140*a* segments the join-up section. The control unit 140*a* identifies the score of each of the plurality of sections obtained by segmenting the join-up section by using the score table 111 and the map information. The control unit 140*a* determines the get-ahead position based on the score of each of the plurality of sections. For example, the control unit 140*a* determines a section having the highest score among the scores of the plurality of sections as the get-ahead position.

Further, when identifying the score, the control unit 140*a* may identify the score of each of the plurality of sections by using the weather information, the present time, or the preference information on the user.

According to the modification of the third embodiment, when the AMR 20 is capable of getting ahead, the information processing device 100*a* is capable of making the AMR 20 move to the get-ahead position. The AMR 20 stays on standby at the get-ahead position. The get-ahead position is a spot suitable as the parcel handover spot. Therefore, the user can receive the parcel at ease.

Features in the embodiments described above can be appropriately combined with each other.

DESCRIPTION OF REFERENCE CHARACTERS

30, 32: movement course, 31, 33: get-ahead position, 32, 34: position, 41: movement course, 42-44: section, 100, 100*a*, 100*b*: information processing device, 101: processor, 102: volatile storage device, 103: nonvolatile storage device,

110: storage unit, 111: score table, 120, 120*a*, 120*b*: acquisition unit, 130, 130*a*, 130*b*: generation unit, 140, 140*a*, 140*b*: control unit, 150, 150*b*: prediction unit

What is claimed is:

1. An information processing device comprising:

acquiring circuitry to acquire map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section;

predicting circuitry to predict a movement course of the first mobile object by using the position information on the first mobile object, the map information, and the movement history records of the first mobile object, and predict a join-up section as a section in which the first mobile object and the second mobile object join up by using the movement course of the first mobile object, the position information on the first mobile object, the position information on the second mobile object, the speed information on the first mobile object, and the speed information on the second mobile object;

controlling circuitry to segment the join-up section, identify the score of each of a plurality of sections obtained by segmenting the join-up section by using the score information and the map information, and determine a join-up spot based on the score of each of the plurality of sections; and generating circuitry to generate course information regarding the second mobile object based on the map information, the join-up spot, and the position information on the second mobile object, wherein the controlling circuitry calculates a speed of the second mobile object for making the first mobile object and the second mobile object join up at the join-up spot by using the movement course of the first mobile object, the speed information on the first mobile object, and the course information regarding the second mobile object, performs control based on the course information regarding the second mobile object on the second mobile object, and performs control on the second mobile object so that the second mobile object moves at the calculated speed.

2. The information processing device according to claim 1, wherein the score information indicates a score corresponding to a section and indicates a score corresponding to weather, the acquiring circuitry acquires weather information, and the controlling circuitry identifies the score of each of the plurality of sections by using the score information, the map information and the weather information.

3. The information processing device according to claim 1, wherein the score information indicates a score corresponding to a section and indicates a score corresponding to a time slot, the acquiring circuitry acquires a present time, and the controlling circuitry identifies the score of each of the plurality of sections by using the score information, the map information and the present time.

4. An information processing device comprising:

acquiring circuitry to acquire map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section;

predicting circuitry to predict a movement course of the first mobile object by using the position information on the first mobile object, the map information, and the movement history records of the first mobile object, and predict a join-up section as a section in which the first mobile object and the second mobile object join up based on the movement course of the first mobile object, the position information on the first mobile object, the position information on the second mobile object, the speed information on the first mobile object, and the speed information on the second mobile object;

controlling circuitry to segment the join-up section, identify the score of each of a plurality of sections obtained by segmenting the join-up section by using the score information and the map information, determine a get-ahead position based on the score of each of the plurality of sections, calculate a distance to the get-ahead position based on the position information on the first mobile object and the movement course of the first mobile object, calculate an arrival time of the first mobile object as a time when the first mobile object arrives at the get-ahead position by using the calculated distance and the speed information on the first mobile object, calculate a distance to the get-ahead position based on the position information on the second mobile object and the map information, calculate an arrival time of the second mobile object as a time when the second mobile object arrives at the get-ahead position by using the calculated distance and the speed information on the second mobile object, and judge whether the second mobile object is capable of getting ahead or not based on the arrival time of the first mobile object and the arrival time of the second mobile object; and generating circuitry to generate course information regarding the second mobile object for making the second mobile object move to the get-ahead position based on the map information, the position information on the second mobile object, and the get-ahead position when the second mobile object is capable of getting ahead, wherein the controlling circuitry performs control based on the course information regarding the second mobile object on the second mobile object.

5. The information processing device according to claim 4, wherein the acquiring circuitry acquires information regarding a user riding in the first mobile object, and the predicting circuitry predicts the movement course of the first mobile object by using the position information on the first mobile object, the map information, the movement history records of the first mobile object, and the information regarding the user.

6. The information processing device according to claim 4, wherein when the second mobile object is incapable of getting ahead, the predicting circuitry predicts a future position of the first mobile object based on the movement course of the first mobile object, the position information on the first mobile object, the speed information on the first mobile object, and a predetermined time, and the generating circuitry generates course information regarding the second mobile object for making the second mobile object move to the future position of the first mobile object based on the map information, the position information on the second mobile object, and the future position of the first mobile object.

7. An information processing device comprising:

acquiring circuitry to acquire map information, position information on a first mobile object capable of moving by means of autonomous driving, and position information on a second mobile object capable of carrying a parcel and moving by means of autonomous driving, acquire a movement course of the first mobile object from the first mobile object, and acquire speed information on the first mobile object, speed information on the second mobile object and score information indicating a score corresponding to a section;

predicting circuitry to predict a join-up section as a section in which the first mobile object and the second mobile object join up based on the movement course of the first mobile object, the position information on the first mobile object, the position information on the second mobile object, the speed information on the first mobile object, and the speed information on the second mobile object;

controlling circuitry to segment the join-up section, identify the score of each of a plurality of sections obtained by segmenting the join-up section by using the score information and the map information, determine the get-ahead position based on the score of each of the plurality of sections, calculate a distance to the get-ahead position based on the position information on the first mobile object and the movement course of the first mobile object, calculate an arrival time of the first mobile object as a time when the first mobile object arrives at the get-ahead position by using the calculated distance and the speed information on the first mobile object, calculate a distance to the get-ahead position based on the position information on the second mobile object and the map information, calculate an arrival time of the second mobile object as a time when the second mobile object arrives at the get-ahead position by using the calculated distance and the speed information on the second mobile object, and judge whether the second mobile object is capable of getting ahead or not based on the arrival time of the first mobile object and the arrival time of the second mobile object; and generating circuitry to generate course information regarding the second mobile object for making the second mobile object move to the get-ahead position based on the map information, the position information on the second mobile object, and the get-ahead position when the second mobile object is capable of getting ahead, wherein the controlling circuitry performs control based on the course information regarding the second mobile object on the second mobile object.

8. The information processing device according to claim 7, wherein the predicting circuitry predicts a future position of the first mobile object based on the movement course of the first mobile object, the position information on the first mobile object, the speed information on the first mobile object, and a predetermined time when the second mobile object is incapable of getting ahead, and the generating circuitry generates course information regarding the second mobile object for making the second mobile object move to the future position of the first mobile object based on the map information, the position information on the second mobile object, and the future position of the first mobile object.

9. The information processing device according to claim 7, wherein the score information indicates a score corresponding to a section and indicates a score corresponding to weather, the acquiring circuitry acquires weather information, and the controlling circuitry identifies the score of each of the plurality of sections by using the score information, the map information and the weather information.

10. The information processing device according to claim 7, wherein the score information indicates a score corresponding to a section and indicates a score corresponding to a time slot, the acquiring circuitry acquires a present time, and the controlling circuitry identifies the score of each of the plurality of sections by using the score information, the map information and the present time.

11. The information processing device according to claim 4, wherein when the second mobile object is capable of getting ahead, the generating circuitry generates course information regarding the second mobile object for making the second mobile object move to the get-ahead position and move in a direction opposite to a direction in which the first mobile object moves along the movement course based on the map information, the movement course of the first mobile object, the position information on the second mobile object, and the get-ahead position.

12. The information processing device according to claim 1, wherein the acquiring circuitry acquires position information on a delivery source of the parcel, and the generating circuitry generates the course information regarding the second mobile object based on the map information, the position information on the delivery source, the position information on the first mobile object, and the position information on the second mobile object.

13. The information processing device according to claim 1, wherein the acquiring circuitry acquires the position information on the first mobile object and the position information on the second mobile object after the course information regarding the second mobile object is generated, and the controlling circuitry transmits an advance notice to the first mobile object when a distance between a position indicated by the position information on the first mobile object and a position indicated by the position information on the second mobile object is less than or equal to a predetermined threshold value.

14. The information processing device according to claim 1, wherein the acquiring circuitry acquires the position information on the first mobile object and the position information on the second mobile object after the course information regarding the second mobile object is generated, and the controlling circuitry executes a process of judging whether the second mobile object has joined up with the first mobile object or not based on the position information on the first mobile object and the position information on the second mobile object, and when the second mobile object does not join up with the first mobile object within a predetermined time, controls the second mobile object so that the second mobile object moves at a speed higher than present speed of the second mobile object.

15. A control method performed by an information processing device, the control method comprising:

acquiring map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section, predicting a movement course of the first mobile object by using the position information on the first mobile object, the map information, and the movement history records of the first mobile object, predicting a join-up section as a section in which the first mobile object and the second mobile object join up by using the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information;

determining a join-up spot based on the score of each of the plurality of sections;

generating course information regarding the second mobile object based on the map information, the join-up spot, and the position information on the second mobile object;

calculating a speed of the second mobile object for making the first mobile object and the second mobile object join up at the join-up spot by using the movement course of the first mobile object, the speed information on the first mobile object, and the course information regarding the second mobile object; and performing control based on the course information regarding the second mobile object on the second mobile object, and performing control on the second mobile object so that the second mobile object moves at the calculated speed.

16. A control method performed by an information processing device, the control method comprising:

acquiring map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section, predicting a movement course of the first mobile object by using the position information on the first mobile object, the map information, and the movement history records of the first mobile object, predicting a join-up section as a section in which the first mobile object and the second mobile object join up based on the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information;

determining a get-ahead position based on the score of each of the plurality of sections;

calculating a distance to the get-ahead position based on the position information on the first mobile object and the movement course of the first mobile object, calculating an arrival time of the first mobile object as a time when the first mobile object arrives at the get-ahead position by using the calculated distance and the speed information on the first mobile object, calculating a distance to the get-ahead position based on the position information on the second mobile object and the map information, calculating an arrival time of the second mobile object as a time when the second mobile object arrives at the get-ahead position by using the calculated distance and the speed information on the second mobile object, and judging whether the second mobile object is capable of getting ahead or not based on the arrival time of the first mobile object and the arrival time of the second mobile object;

generating course information regarding the second mobile object for making the second mobile object move to the get-ahead position based on the map information, the position information on the second mobile object, and the get-ahead position when the second mobile object is capable of getting ahead; and performing control based on the course information regarding the second mobile object on the second mobile object.

17. A control method performed by an information processing device, the control method comprising:

acquiring map information, position information on a first mobile object capable of moving by means of autonomous driving, and position information on a second mobile object capable of carrying a parcel and moving by means of autonomous driving, acquiring a movement course of the first mobile object from the first mobile object, acquiring speed information on the first mobile object, speed information on the second mobile object and score information indicating a score corresponding to a section, predicting a join-up section as a section in which the first mobile object and the second mobile object join up based on the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information;

determining the get-ahead position based on the score of each of the plurality of sections;

calculating a distance to the get-ahead position based on the position information on the first mobile object and the movement course of the first mobile object, calculating an arrival time of the first mobile object as a time when the first mobile object arrives at the get-ahead position by using the calculated distance and the speed information on the first mobile object, calculating a distance to the get-ahead position based on the position information on the second mobile object and the map information, calculating an arrival time of the second mobile object as a time when the second mobile object arrives at the get-ahead position by using the calculated distance and the speed information on the second mobile object, and judging whether the second mobile object is capable of getting ahead or not based on the arrival time of the first mobile object and the arrival time of the second mobile object;

generating course information regarding the second mobile object for making the second mobile object move to the get-ahead position based on the map information, the position information on the second mobile object, and the get-ahead position when the second mobile object is capable of getting ahead; and performing control based on the course information regarding the second mobile object on the second mobile object.

18. An information processing device comprising:

a processor to execute a program; and a memory to store the program which, when executed by the processor, performs processes of, acquiring map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section, predicting a movement course of the first mobile object by using the position information on the first mobile object, the map information, and the movement history records of the first mobile object, predicting a join-up section as a section in which the first mobile object and the second mobile object join up by using the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information, determining a join-up spot based on the score of each of the plurality of sections, generating course information regarding the second mobile object based on the map information, the join-up spot, and the position information on the second mobile object, calculating a speed of the second mobile object for making the first mobile object and the second mobile object join up at the join-up spot by using the movement course of the first mobile object, the speed information on the first mobile object, and the course information regarding the second mobile object, and performing control based on the course information regarding the second mobile object on the second mobile object, and performing control on the second mobile object so that the second mobile object moves at the calculated speed.

19. An information processing device comprising:

a processor to execute a program; and a memory to store the program which, when executed by the processor, performs processes of, acquiring map information, position information on a first mobile object capable of moving by means of manual driving or autonomous driving, position information on a second mobile object capable of carrying a parcel and moving by means of autonomous driving, movement history records of the first mobile object, speed information on the first mobile object, speed information on the second mobile object, and score information indicating a score corresponding to a section, predicting a movement course of the first mobile object by using the position information on the first mobile object, the map information, and the movement history records of the first mobile object, predicting a join-up section as a section in which the first mobile object and the second mobile object join up based on the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information, determining a get-ahead position based on the score of each of the plurality of sections, calculating a distance to the get-ahead position based on the position information on the first mobile object and the movement course of the first mobile object, calculating an arrival time of the first mobile object as a time when the first mobile object arrives at the get-ahead position by using the calculated distance and the speed information on the first mobile object, calculating a distance to the get-ahead position based on the position information on the second mobile object and the map information, calculating an arrival time of the second mobile object as a time when the second mobile object arrives at the get-ahead position by using the calculated distance and the speed information on the second mobile object, and judging whether the second mobile object is capable of getting ahead or not based on the arrival time of the first mobile object and the arrival time of the second mobile object, generating course information regarding the second mobile object for making the second mobile object move to the get-ahead position based on the map information, the position information on the second mobile object, and the get-ahead position when the second mobile object is capable of getting ahead, and performing control based on the course information regarding the second mobile object on the second mobile object.

20. An information processing device comprising:

a processor to execute a program; and a memory to store the program which, when executed by the processor, performs processes of, acquiring map information, position information on a first mobile object capable of moving by means of autonomous driving, and position information on a second mobile object capable of carrying a parcel and moving by means of autonomous driving, acquiring a movement course of the first mobile object from the first mobile object, acquiring speed information on the first mobile object, speed information on the second mobile object and score information indicating a score corresponding to a section, predicting a join-up section as a section in which the first mobile object and the second mobile object join up based on the movement course of the first mobile object, the position information on the first mobile object, the position information on the second mobile object, the speed information on the first mobile object, and the speed information on the second mobile object, segmenting the join-up section, and identifying the score of each of a plurality of sections obtained by segmenting the join-up section by using the score information and the map information, determining the get-ahead position based on the score of each of the plurality of sections, calculating a distance to the get-ahead position based on the position information on the first mobile object and the movement course of the first mobile object, calculating an arrival time of the first mobile object as a time when the first mobile object arrives at the get-ahead position by using the calculated distance and the speed information on the first mobile object, calculating a distance to the get-ahead position based on the position information on the second mobile object and the map information, calculating an arrival time of the second mobile object as a time when the second mobile object arrives at the get-ahead position by using the calculated distance and the speed information on the second mobile object, and judging whether the second mobile object is capable of getting ahead or not based on the arrival time of the first mobile object and the arrival time of the second mobile object, generating course information regarding the second mobile object for making the second mobile object move to the get-ahead position based on the map information, the position information on the second mobile object, and the get-ahead position when the second mobile object is capable of getting ahead, and performing control based on the course information regarding the second mobile object on the second mobile object.

* * * * *